United States Patent Office

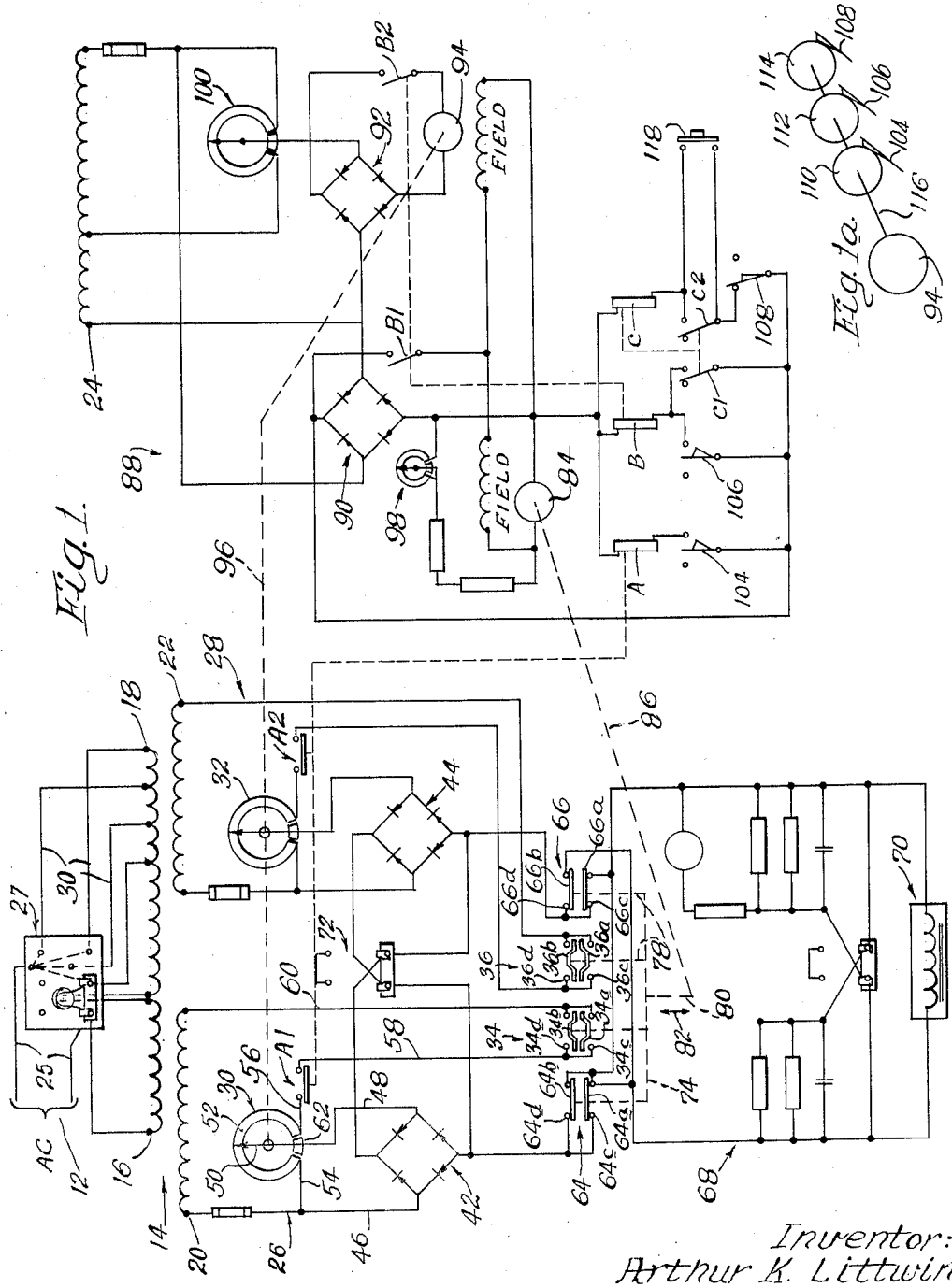

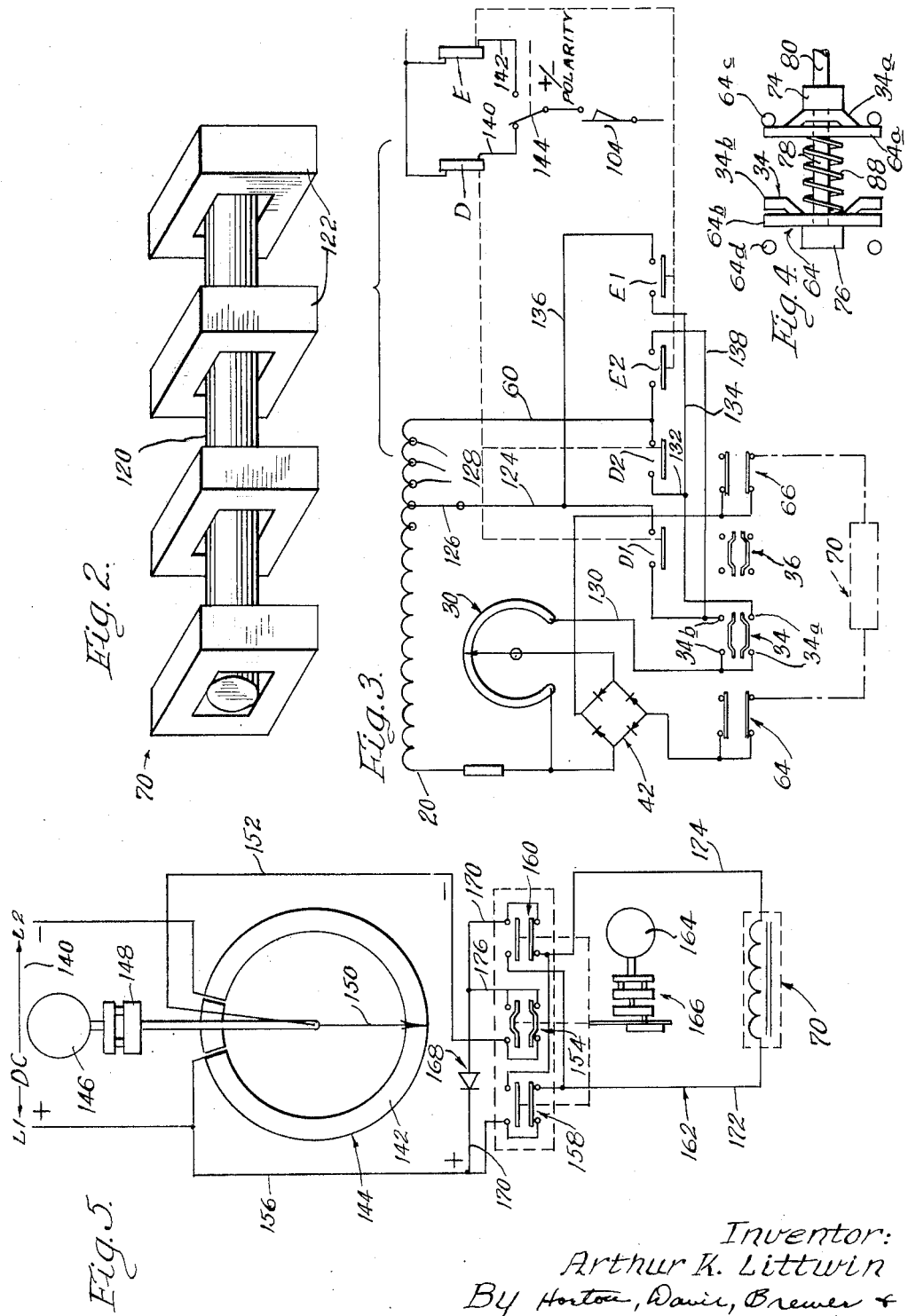

3,218,522
Patented Nov. 16, 1965

3,218,522
DEMAGNETIZING APPARATUS
Arthur K. Littwin, Lincolnwood, Ill., assignor, by mesne assignments, to Arthur K. Littwin, Robert L. Littwin, Horace A. Young, and Donald F. Littwin, trustees
Filed May 15, 1961, Ser. No. 110,116
15 Claims. (Cl. 317—157.5)

The present invention relates to apparatus for and method of demagnetizing.

A general and broad object of the invention is to provide apparatus for demagnetizing various objects that had previously been magnetized, such, for example, as a piece of steel which became magnetized due to working the piece, or a magnetic chuck and a work piece thereon, in a machine tool, or any other objects that may have been magnetized for any reason.

A principal object of the invention is to provide apparatus for demagnetizing an object in a great number of steps in which a single step consequently represents a small increment, so that at the end of the demagnetizing operation a minimum of magnetization remains.

Another object is to provide apparatus of the general character noted in which the number of steps in the demagnetizing cycle may be varied for any given cycle.

A further object is to provide novel apparatus for demagnetizing of the general character noted above, which is equally applicable in connection with either an A.C. or D.C. source of current, and in either of which D.C. is imposed directly on the object to be demagnetized.

A still further object of the invention is to provide apparatus for and method of demagnetizing of the foregoing general character, having novel means for interrupting a D.C. circuit without arcing.

A still further object is to provide apparatus for demagnetizing of the foregoing general character, which includes a novel arrangement for imposing D.C. on the object to be demagnetized at different voltage values in opposite directions in the reversing steps, in accordance with the value and the polarity of the residual magnetism, which is to be eliminated in the demagnetizing operation.

Other objects and advantages of the invention will appear from the following detailed description taken in conjunction with the accompanying drawings in which:

FIG. 1 is a diagram of an electrical circuit, utilized in one embodiment of the invention;

FIG. 1a is a diagrammatic illustration of a cam arrangement utilized in connection with the circuit of FIG. 1;

FIG. 2 shows an object to be demagnetized, together with a plurality of demagnetizing electromagnets;

FIG. 3 is a diagram of a portion of another circuit representing a modification of the form represented in FIG. 1;

FIG. 4 is a detail view of the interrupting and reversing switch means utilized in the apparatus; and FIG. 5 is a diagram of an electrical circuit representing another embodiment of the invention.

Certain features of the present invention are incorporated in my prior Patent No. 2,825,854, dated March 4, 1958, to which attention is directed for a disclosure of further details of these common features. Those features will be described herein generally and partially, but only to such an extent as will facilitate understanding of the present invention.

In general, the invention has to do with demagnetizing an object that has previously been magnetized. Such objects take many different forms, and as disclosed in the prior patent referred to, a magnetic chuck for holding a work piece in a machine tool represents a very common type of object to which the demagnetizing operation of the present invention may be applied. The magnetic chuck is magnetized to hold the work piece in position thereon, and the work piece itself also becomes magnetized. Upon completion of the operation on the work piece, the current to the chuck is turned off, but a considerable degree of residual magnetism remains in the chuck and the work piece, and the apparatus of the present invention is useful in eliminating, or at least greatly reducing such residual magnetism so that the work piece may readily be lifted from the chuck.

Another article that becomes magnetized is steel, being commonly magnetized as a result of other working operations thereon, such as in rolling it, etc., and in the case of such steel objects, which are many times very massive, the magnetism therein reaches a very high absolute value and it is difficult to demagnetize them to the desired degree. Such a massive piece of steel is illustrated in FIG. 2. The present invention is particularly adaptable to demagnetizing such an object, due to the fact that the apparatus employs a large number of steps in the demagnetizing operation, so that each step represents a very small increment, and at the end of the demagnetizing operation the value of the magnetism therein is no greater than that represented by one step or increment, if at all existent.

Referring in detail to the drawings, attention is directed first to FIG. 1, which includes an A.C. source 12 leading to a transformer 14 which is made up of a primary, including two portions 16 and 18, and a plurality of secondaries, in the present instance three, 20, 22, and 24. The line conductors 25 leading from the A.C. source connect through a switching means 27 with the primary, the switching means including a plurality of conductors 30 for selective tapping at least one of the primaries, such as 18.

The secondaries 20 and 22 are incorporated in circuit portions 26 and 28 which are identical or similar. The circuit portions 26 and 28, respectively, include therein, in series with the secondaries, variable power controls or rheostats 30 and 32, and interrupting switches 34 and 36. Additionally, the circuit portions 26 and 28 include relay switches A1 and A2 for controllably energizing these circuit portions, as described below.

Incorporated in the circuit portions 26 and 28 also are rectifiers 42 and 44, conected in series with the power controls or rheostats 30 and 32. For example, referring to the lefthand rectifier 42, the input points of the rectifier are connected to conductors 46 and 48, the latter, 48, being connected with a sweep arm 50 of the rheostat, which sweeps over the coiled portion 52 of the rheostat, bridging the turns thereof at all points so that at no time is there interruption in the rheostat, as is well known in the case of a conventional rheostat. The coiled portion 52 is conected at one end through a conductor 54 with the conductor 46, and at the other end through a conductor 56, and switch A1, conductor 58, switch 34, and conductor 60 to the secondary. An insulation bridge 62 is interposed between the ends of the coiled portion of the rheostat to enable the sweep arm 50 to ride off of the coiled portion and onto the bridge to enable full 360° sweep of the arm and open the circuit thereby. The foregoing description of the circuit portion 26 applies also to the circuit portion 28, it being believed unnecessary to repeat the description for the latter circuit portion.

Associated with the interrupting switches 34 and 36 are reversing switches 64 and 66 connected with the output points of the rectifiers 42 and 44 respectively, and to a D.C. circuit portion 68 which incorporates therein the object to be demagnetized, represented here by the reference numeral 70 and which may be constituted by electromagnets for use in demagnetizing the steel piece of FIG. 2, a magnetic chuck, or other forms.

Switching means 72 provides for connection of the secondaries of the transformer, through the circuit portions 26 and 28 in series or parallel, selectively.

The switching means for interrupting the A.C. circuit and reversing the D.C. circuit, and constituted by the switches 34, 36, 64 and 66, may be mechanically similar, or the same in operation, to the switching means contained in FIG. 3 of my prior patent referred to above. Stated broadly, the object of the switching means is to perform the following steps in a given cycle: interrupt the A.C. circuit; while the circuit is interrupted, reverse the D.C. circuit so as to reverse the polarity of the voltage imposed on the object to be demagnetized; and then close the A.C. circuit. The reversing switches 64 and 66 are of the make-before-break type, and in the reversing step these switches are closed to the opposite contacts before being opened to the previous contacts. More specifically, attention is directed to FIGS. 1 and 4—the switch 64 includes contact bars 64a and 64b cooperating with contacts 64c and 64d respectively; the switch 34 includes contact bars 34a and 34b, which cooperate with contacts 34c and 34d respectively; the switch 36 includes contact bars 36a and 36b which cooperate with contacts 36c and 36d respectively; and the switch 66 includes contact bars 66a and 66b which cooperate with contacts 66c and 66d respectively.

The contact bars of the various switches are arranged in gang, and are actuated by common pusher bars 74 and 76 (FIG. 4). The respectively aligned contact bars are mounted on rods 78 which are secured to the pusher bars 74 and 76. One of the pusher bars, 74, is shown in FIG. 1 where it is connected by an actuating rod 80, the latter being also shown in FIG. 4. The rod 80 is adapted to be reciprocated, as indicated by the double pointed arrow 82 for operating the switches by means of a motor 84, to be referred to again hereinbelow, and through the instrumentality of means indicated diagrammatically at 86, which may be any suitable means for converting rotary motion into reciprocating motion. A mechanical means for this purpose is shown in FIG. 5, which may be utilized in the present instance. Suffice it to say that upon operation of the motor 84 the rod 80 is reciprocated, and the ganged switches are reciprocated in their opening and closing movements. The switches, as shown in FIG. 4, are arranged generally in alignment, and the contact bars of only the switches 64 and 34 are in view. The corresponding contact bars of the two switches 34 and 36 are actuated similarly and simultaneously, as are the corresponding contact bars of the switches 34 and 36, but for simplicity, the following description refers only to those switches in view, namely, 64 and 34. The contact bars of each switch are biased apart, by suitable means, such as springs 88, into engagement with the pusher bars 74 and 76, or the contacts of the switches. Upon initial movement of the rod 80 in a first direction (e.g., upwardly FIG. 1, to the left FIG. 4) the bar 34a is moved from its contacts 34c, due to its position and shape, and while the contact bar 64a remains in egnagement with the contacts 64c, the bar 34b at the opposite side of the switch moves toward its contacts, and in this movement it will be seen that the bar 34a moves from its contacts before the opposite bar 34b engages its contacts; in this initial movement the bar 64a remains in engagement with its contacts, and the bar 64b engages its contacts before the bar 64a moves away from its contacts. Thus, at one point, both sides of the switch 64 are in engagement with their respective contacts. In the following increment of movement, the bar 64a is moved from its contacts 64c and thereafter the bar 34b engages its contacts. The movements in the opposite direction are similar, but each in the corresponding opposite directions.

The circuitry in the circuit portion 68, together with the arrangement of the connections with the switches 34, 36, 64 and 66, provide for opposite polarity to be imposed on the object to be demagnetized (70) in respectively opposite positions of the switches, as will be understood.

The circuit portion 88 at the righthand portion of FIG. 1 serves as a control circuit for the operation of the apparatus heretofore described. The secondary 24 referred to above is incorporated in this circuit portion 88. Also included in this circuit portion are rectifiers 90 and 92 for supplying D.C. current respectively to motors 84, referred to above, and 94. Both of these motors are of variable speed character, as referred to again hereinbelow more in detail. The motor 94, through the medium of a shaft and other suitable mechanism indicated diagrammatically by the line 96, rotates the rheostats 30 and 32.

Associated with the motor 84 is a variable power control, or rheostat 98, which may be manually actuated and set, operative for controlling the speed of the motor 84, and hence the period of reciprocation of the rod 80 and switching means associated therewith.

Another power control, or rheostat 100, is included in the circuit portion 88, and operative for controlling the speed of the motor 94 and hence of the movement of the arms 50, together, over the rheostats 30 and 32. It will be understood that in the shaft 96 and associated mechanism may be included in a speed reducer, as well as a changed speed mechanism, if desired, which may be utilized in conjunction with the variable speed feature of the motor 94, or in substitution thereof, the consideration being the variation in speed of the arms 50 over the corresponding rheostats.

Incorporated in the circuit portion 88 are relay coils A, B and C; the coil A is effective when energized for closing switches A1 and A2 in the circuit portions 26 and 28; the coil B is operative when energized for closing switches B1 and B2 associated with the respective rectifiers 90 and 92; and the coil C is operative when energized for transferring switches C1 and C2 to their positions opposite that shown in the drawings. Other control elements in the circuit portion 88 include cam operated switches 104, 106 and 108, which are actuated by cams 110, 112 and 114 respectively, mounted on a shaft 116 and driven by motor 94. This arrangement is shown diagrammatically in FIG. 1a. Additionally, a manually actuated switch 118 is provided for manually starting the demagnetizing cycle.

In order to initiate the demagnetizing cycle, the operator closes the starting switch 118; this energizes the C coil which then transfers switches C1 and C2, C2 setting up a holding circuit for the C coil, after which the switch 118 may be released; transfer of the switch C1 energizes the B coil, which closes switches B1 and B2, which in turn set up circuits to the respective motors 84 and 94; in addition to other functions performed by these motors referred to below, rotation of the motor 94 rotates the cams 110, 112 and 114, which in turn actuate the switches 104, 106 and 108 in certain timed sequence for controlling the operating steps of the cycle, one of which is the closure of the switch 104 which energizes the A coil and thereby closes the switches A1 and A2, and closes circuit to the rheostats 30 and 32 and in turn to the rectifiers 42 and 44; the D.C. from the latter is then impressed on the object to be demagnetized (70) in a manner described more fully hereinbelow.

The rheostats 30, 32, 98 and 100 are normally open, with the arms (e.g. 50) thereof resting on the insulating bridge. The rheostats 98 and 100 are manually set to the desired positions for establishing the preselected speed of rotation of the motors 84 and 94; and upon energization of the motor 94 the arms 50 of the rheostats 30 and 32 move from the insulating bridges and onto the coiled portions 52 thereof, whereupon the circuits are completed to the rectifiers 42 and 44, the arrangement and timing being such that upon the arms moving onto the turns of the coils of the rheostats, the switch 104 is closed, which thereupon closes the switches A1 and A2.

In the demagnetizing operation, actuation of the motor 84 causes reversal of the D.C. imposed on the object 70 to be demagnetized, as described above, and while this step is being constantly performed, the voltage impressed on the rectifiers 42 and 44 and thus on the object to be demagnetized is gradually reduced due to the operation of the rheostats 30 and 32. When the arms 50 again ride onto the insulating bridges 62, all of the switches 104, 106 and 108 may be opened.

The voltage is reduced in each reversal of the switches 64 and 66, and the rate of reduction can be controlled within a wide range. For example, in a practical installation that has proved very successful, the rheostats 30 and 32 may be varied from 4 minutes per revolution to 20 minutes per revolution; and the motor 84 may be varied through a range of from 12 revolutions per minute to 7 revolutions per minute. Thus a complete cycle is determined by the sweep of the arms 50 over the rheostats 30 and 32, the switching means being actuated throughout this period due to the control of the circuit through the cam means illustrated in FIG. 1a, which is in turn controlled by the motor 94. As an example of the extremely wide range of control provided, assume one extreme; if the rheostats 30 and 32 are set for 4 minutes for one revolution, and the motor 84 makes 7 revolutions per minute, there will be 28 complete changes, or 56 reversals; at the other extreme, if the arms of the rheostats 30 and 32 are set at 20 minutes per revolution, and the motor 84 is set at 12 revolutions per minute, there will be 240 complete changes in a cycle, or 480 reversals. It will be understood that in each reversal of polarity, the rheostats will have migrated from one turn to the next, so as to effect a reduction of voltage in each reversal.

In the demagnetizing operation, it will be understood that the D.C. current imposed on the object 70 to be demagnetized is reversed at each change of position of the switches 64 and 66, and as stated above, at each such change of position, the voltage imposed on the object is reduced. An extremely high value of magnetization can be accommodated in 480 reversals, so that each reversal represents actually a minute increment of magnetization. Hence even extremely great values of magnetization can be satisfactorily reduced to negligible values.

A very important advantage of the invention, in addition to the small steps or increments in reduction of voltage applied, resides in the possibility of variation of speed of the rheostats 30 and 32, and the reversing switches, and these adjustments may be made in a very simple manner, as by setting the rheostats 98 and 100, which may be done either before or during a demagnetizing operation. Additionally, either of the settings may be made independently of the other, that is, the rate of operation of the rheostats 30 and 32 may be set without disturbing the setting of the speed of the motor 84, and vice versa.

Due to the fact that the arms 50 of the rheostats 30 and 32 bridge at least two turns of the rheostats, the circuit through the rheostats remains constantly established throughout the cycle of demagnetizing, and there is no necessity for timing the reversing switches for coordinating them with the rheostats. Since the A.C. circuits through the rheostats 30 and 32 are opened by the switches 34 and 36, it is not necessary for the A.C. portions of the circuit to be interrupted in the reversing operation, this factor being accommodated also by the fact that the reversing switches 64 and 66 are of the make-before-break type.

Attention is again directed to FIG. 2 which shows a steel rod 120 of a kind commonly encountered in steel treating operations. For example, a rod of this kind may be as long as 60 feet and in the neighborhood of two feet in diameter. In such a piece of steel, the immense value of the magnetization thereof can be readily realized, and demagnetizing such a piece presents extremely great problems. For the purpose of demagnetizing the rod 120, a plurality of electromagnets 122 are provided, encircling the rod and spaced therealong; if desired, means may be provided for completing a magnetic circuit through the rod. In the present instance there are four such electromagnets. These electromagnets are incorporated in the D.C. circuit portion 68 (FIG. 1) and correspond to the item indicated by the reference numeral 70. Notwithstanding the extreme problems encountered in demagnetizing such an item, it will be appreciated that if as many reversals of polarity with corresponding reduction in voltage are provided for, as described above, the demagnetizing problem is overcome or greatly minimized. For example, 480 reversals with corresponding and uniform reduction in voltage at the successive reversals results in substantially complete demagnetization, and considering the immensity of the rod 120, the time cycle of 20 minutes is considered entirely satisfactory for the results obtained.

Attention is directed to another important feature of the invention, and to FIG. 3 illustrating a modified form of circuit for use in connection with this feature. The feature has to do particularly with the effectiveness of demagnetizing in a particular step of a demagnetizing cycle. This factor is of particular importance in the case of relatively hard material, such as steel, which has been hardened in an operation that has been performed thereon. This same operation may have been the cause of the magnetization which is to be removed. In working a piece of steel such as in rolling it, the steel becomes hardened and as stated, magnetized. In the demagnetizing operation, the demagnetizing current is imposed on the object, with its polarity opposed to that of the magnetization. In the case of relatively hard steel, the demagnetizing effect does not take place as rapidly as in the case of soft iron, and hence there is a significant time factor in the operation. In practical use of the demagnetizing apparatus the time factor is of great importance, and the demagnetizing cycle is held to a practical minimum of time, and therefore each step in the demagnetizing cycle may not have its full demagnetizing effect. For example, assume that the hard steel has a given value of magnetization; the demagnetizing current is imposed thereon in opposition to the polarity of the magnetization, but due to the practical limits of the time permitted for demagnetizing, the demagnetizing current may not have had full effect, as it would have in an unlimited period of time; in such a case it is desired that the demagnetizing current in the succeeding step be of less value in proportion to a corresponding step in a normal demagnetizing operation.

This phenomenon may be more clear in conjunction with the following description of the circuit of FIG. 3 and its operation. This circuit corresponds to one-half of the circuit portion of FIG. 1, for example, the portion 26 thereof, and includes the rheostat 30, rectifier 42, conductor 60 and switches 64, 34, 36 and 66, as well as the object 70. In addition to the conductor 60 leading from the secondary 20, another conductor 124 is provided, having an adjustable element 126, which can be set at any of a plurality of taps 128 in the secondary 20. The conductor 124 includes a switch D1, and connects to one of the contacts 34b. Another conductor 130 connected to one each of contacts 34a and 34b leads to the rheostat 30.

The conductor 60 connects with another conductor 132 in which is included a switch D2. The conductor 132 connects with the conductor 134, which is connected with the other switch contact 34a. Another conductor 136 is connected with conductor 124, and includes switch E1 therein, and through that switch is connected with conductor 134. The conductor 60, in addition, is connected to switch E2, and through that switch to a conductor 138, which leads to connection with conductor 124 and the corresponding switch contact 34b.

The switches D1 and D2 are relay switches operated by relay coil D, while the relay switches E1 and E2 are operated by relay coil E, the switches being closed upon energization of the coils. The coils D and E together replace the coil A of FIG. 1, and are respectively in conductors 140 and 142, terminating in contacts in a switch 144 which is manually selectively set to one of opposite positions, according to the polarity of the object to be demagnetized. The switch 104 shown in FIG. 3 will be found also in FIG. 1.

Referring now to the application of the apparatus of FIG. 3 to a demagnetizing operation, a first step is to determine the polarity of the magnetization on the object to be demagnetized, e.g., the steel rod. Assuming that it is of positive polarity, a demagnetizing current of negative polarity is imposed thereon in the first step in the demagnetizing cycle. This is effected by setting the switch 144 in the one of its two positions representing negative polarity, and for convenience this position may be assumed to be that shown in FIG. 3. In this step, the conductor 60 is put in circuit through the respective switch D2 and imposes full value of the current on the steel rod according to the capacity of the secondary.

This demagnetizinng current operates to demagnetize the steel rod to the extent of the period of its duration, which as indicated above is set at less than the time required for full effectiveness. Then in the next step of the cycle, the current imposed on the steel rod in the opposite direction is of a value represented by the conductor 124, or less than that of conductor 60. The value of the demagnetizing current at this step is of positive polarity and in the direction of the original magnetization of the rod. Because of the hardness of the steel and consequent greater permanency of the magnetization thereof, a portion of the original magnetism may remain, and this residual magnetization would supplement the demagnetizing current in the second step.

The third step and each subsequent alternate step will be of values represented by the conductor 60, or full capacity of the secondary, while the other steps are of lesser value corresponding to the value represented by the conductor 124. Hence, the greater demagnetizing current in the conductor 60 in alternate steps is in opposition to the original magnetization of the steel, while the current of lesser value in the remaining steps, as represented by the conductor 124, is in the direction of the original magnetization.

It will be understood that the successive steps in each direction are diminished in voltage value due to the progressive reduction through the rheostat.

When the original magnetization of the steel rod is in the opposite direction than that assumed above, i.e., negative instead of positive, the switch 144 is thrown to its opposite position and the same conditions and steps as desccribed above exist or take place.

The conductor 124 is set at the tapping in the secondary that is calculated to produce the desired differential in voltage value between that conductor and the conductor 60, according to the hardness or other condition producing relative permanency of magnetism in the steel rod.

A further important feature of the invention is an arrangement for interrupting D.C. without arcing. The circuit of FIG. 5 is basically similar to that of FIG. 1, except that a D.C. source is provided, and only a single control rheostat (30 or 32) and corresponding parts are provided. The D.C. source is indicated at 140, which leads to opposite ends of the coiled portion 142 of the rheostat 144, which is essentially the same as the rheostat 30 or 32. The rheostat 144 is driven by a suitable variable speed motor 146 through drive transmitting mechanism 148. Connected to the arm 150 of the rheostat is a conductor 152 leading to contacts at one side of an interrupting switch 154 which corresponds to the two switches 34, 36 of FIGURE 1. Connected to the coiled portion 142 of the rheostat is another conductor 156, which leads to contacts at one side of a reversing switch 158, which is one of a pair of reversing switches, the other being indicated at 160. The reversing switches 158 and 160 are connected in another circuit 162 corresponding in all material respects with the D.C. circuit portion 68 of FIG. 1, and including the object to be demagnetized indicated at 70. The switches 158, 154 and 160, together, are operated by a motor 164 corresponding to the motor 84 of FIG. 1, and operating through a drive transmitting mechanism 166 for actuating the switches for interrupting the circuit and reversing the D.C. imposed on the object 70, as described above in connection with the apparatus of FIG. 1.

Interposed in the circuit of the present modification is a rectifier 168, included in a conductor 170, which is connected with the conductor 156 and with the contacts at one side of the reversing switch 160, as well as the contacts at one side of the interrupting switch 154.

The conductor 170, which includes the rectifier 168, is connected across the D.C. line, namely, the conductor 156 at one side and, through the switches, with the conductor 152 at the other side. The rectifier 168 is disposed in opposition to the polarity of the conductors 156 and 152. In the demagnetizing operation, the circuit is established through the object 70 to be demagnetized when the switches are closed, in the following manner: assume the switches to be in their position shown in FIG. 5; conductor 156, the lower contact bar of switch 158, conductor 172, the object 70, conductor 174, the lower bar of switch 160, conductor 170, conductor 176, the lower bar of interrupter switch 154 and conductor 152. When the switches are in their opposite and upper positions, the circuit is established from the conductor 156 to 152 through the object 70, but in the opposite direction through the object 70, as will be understood.

In the interrupting and reversing operation, the circuit from the conductors 156, 152 is interrupted to the conductors 172, 174; for example, when the interrupting switch 154 is open to both sides thereof, the conductor 152 is not connected. This condition leaves a sub-circuit established through the object 70 and the rectifier 168, as follows: it will be recalled that the switches 158 and 160 are of the make-before-break type, and they remain closed while the interrupting switch 154 is open. Hence, since the conductor 152 is open, the conductor 170 completes the circuit through the switches 158 and 160, with the conductor 162 and 174, and the voltage imposed on the object 70 in the previous step is enabled to dissipate itself through the circuit, which includes the rectifier 168. A similar condition exists when the switches 158 and 160 are closed to the upper contacts and open to the lower contacts, while the interrupting switch 154 is open. In both cases, the rectifier 168 enables the voltage imposed on the object 70 to dissipate itself through that sub-circuit. The arrangement of the rectifier 168 in opposition to the polarity in the line conductors prevents shorting of the conductors 156 and 152.

The rectifier 168 provides an extremely rapid and, from a practical standpoint, substantially instantaneous dissipation of the voltage as compared with interposing a resistor or coil in the circuit, both of which require extremely great periods of time for dissipation of the voltage.

While I have shown herein certain preferred embodiments of the invention, it will be understood that changes may be made therein within the scope of the appended claims.

I claim:

1. Apparatus for demagnetizing an object, comprising a D.C. circuit including the object to be demagnetized, means for impressing direct current on the object, switch means for interrupting the direct current and reversing the polarity thereof at each interruption, means for progressively reducing the voltage of the direct current in the D.C. circuit, driving means for simultaneously operating the switch means and voltage reducing means, control means for initiating and terminating operation of the driving means and thereby predetermining a demagnetizing cycle of operation, and means for adjustably varying the rate of operation of either of the switch means or the voltage reducing means independently of the other.

2. The invention set out in claim 1 in which the last named means includes separate means operative for independently adjustably varying the rate of operation of the switch means or the voltage reducing means.

3. The invention set out in claim 1 in which the switch means includes reversing switch means of the make-before-break type whereby to prevent arcing in the D.C. circuit.

4. The invention set out in claim 1 in which the voltage reducing means maintains connection therethrough throughout its operating cycle in reducing voltage.

5. Apparatus for demagnetizing an object, comprising circuit means, at least a portion of the circuit means being a D.C. circuit including the object to be demagnetized, means for imposing D.C. on the object, switch means for interrupting the circuit means and reversing the polarity of the D.C. at each interruption, a rheostat having a large number of turns in said circuit means and operable for progressively reducing the voltage of the direct current in the D.C. circuit, driving means for simultaneously operating the switch means and rheostat, control means for initiating and terminating operation of the driving means and thereby predetermining a demagnetizing cycle of operation, and means for independently adjustably varying the rate of operation of the switch means and rheostat.

6. The invention set out in claim 5 in which the rheostat includes a rider contacting at least one turn at all times through the voltage reducing movements.

7. Apparatus for demagnetizing an object comprising circuit means including an A.C. circuit and a D.C. circuit, the D.C. circuit including therein the object to be demagnetized, means in the A.C. circuit for progressively reducing the voltage therein, first switch means for interrupting the A.C. circuit, rectifier means between the circuits for converting the A.C. to D.C., switch means for reversing the polarity in the D.C. circuit, actuating means operative for repeatedly opening said first switch means and operating the reversing switch means at each opening of the first switch means, driving means for simultaneously operating the actuating means and thus both switch means and the voltage reducing means, control means for initiating and terminating operation of the driving means and thereby predetermining a demagnetizing cycle of operation, and means for independently adjustably varying the rate of operation of (a) the actuating means and thus both switch means and (b) the voltage reducing means.

8. Apparatus for demagnetizing an object, comprising a D.C. circuit including the object to be demagnetized and having connections for connection with a D.C. source in predetermined relation, means in the circuit for progressively reducing the voltage therein, means for interrupting the circuit, means for reversing the polarity of the current imposed on the object to be demagnetized, means for operating the interrupting means and actuating the reversing means each time the circuit is interrupted, driving means for simultaneously operating the voltage reducing means and the interrupting means, control means for initiating and terminating operation of the driving means and thereby predetermining a demagnetizing cycle of operation, a supplemental circuit shunting the connections for the D.C. source and containing the object to be demagnetized in series relation, and switch means controlled by the control means operative for maintaining circuit through the supplemental circuit and the object to be demagnetized at all times when the first-mentioned circuit is interrupted and thereby preventing arcing.

9. The invention set out in claim 8 in which the D.C. circuit includes rectifier means in opposition to the polarity of the D.C. source when the D.C. circuit is connected therewith.

10. Apparatus for demagnetizing an object, comprising a circuit including the object to be demagnetized and having connections for connection with a D.C. source, means in the circuit for progressively reducing the voltage therein, switch means for interrupting the circuit, switch means for reversing the voltage through the object, means for simultaneously operating the interrupting switch means and actuating the reversing switch means each time the circuit is interrupted, driving means for operating the voltage reducing means and the interrupting switch means, control means for initiating and terminating operation of the driving means and thereby predetermining a demagnetizing cycle of operation, means for independently adjustably varying the rate of operation of the voltage reducing means and the interrupting switch means during a cycle of operation, and supplemental circuit means operative for maintaining the circuit through the reversing switch means and the object to be demagnetized at all times when the first-mentioned circuit is interrupted and thereby preventing arcing.

11. Apparatus for demagnetizing an object, comprising a circuit including a first portion and a second portion, the first portion having connections for connection with a D.C. source and including a rheostat for reducing the voltage in the circuit, and the second portion including the object to be demagnetized, switch means interposed between the first and second portions of the circuit, the switch means including an interrupting switch which when open serves to interrupt the first and second portions of the circuit and a reversing switch of the make-before-break type, both switches being operated in gang, the reversing switch establishing a supplemental circuit in the second portion of the circuit and which includes therein the object to be demagnetized, means operative for actuating said switch means in the following sequential order:

(a) actuating the interrupting switch and thereby interrupting the circuit portions, while the second portion remains complete;

(b) repositioning the reversing switch while the interrupting switch is open, to a position for reversing the current in the second portion when it is again reestablished with the first portion, while maintaining complete circuit in the second portion at all times of the switching operation; and (c) thereafter reestablishing the interrupting switch; driving means for simultaneously operating the rheostat and actuating said switch means, and control means for initiating and terminating operation of the driving means and thereby predetermining a demagnetizing cycle of operation.

12. Apparatus for demagnetizing an object, comprising circuit means including a D.C. circuit which includes therein the object to be demagnetized, means for interrupting said circuit means, means for reversing the polarity of the current imposed on the object to be demagnetized at each interruption, means for reducing the voltage of the direct current, driving means for simultaneously operating the interrupting means, the reversing means and the voltage reducing means, control means for controlling said driving means for initiating and terminating operation of the driving means and thereby predetermining a demagnetizing cycle of operation, whereby the voltage is reduced in successive increments in the demagnetizing operation, and means for manually selectively predetermining the value of the voltage of the D.C. in each of initial and opposite reverse steps in a cycle of operation, whereby successive steps in such cycle of similar polarity of current are progressively reduced.

13. The apparatus set out in claim 12 in which the circuit includes an A.C. portion and a D.C. portion, and rectifier means for converting the A.C. to D.C., the A.C. source includes a transformer, and the means for selectively predetermining the voltage value in the initial step of each demagnetizing operation includes a plurality of tappings in the transformer establishing different voltage values, and means for manually selectively connecting the transformer in circuit at selective tappings.

14. The apparatus set out in claim 12 in which means is provided for adjusting selectively the differential of the voltage values in opposite and successive steps in the demagnetizing operation.

15. The invention set out in claim 5 in which a variable speed motor is provided for operating each the switch means and the rheostat, and the means for terminating the cycle of operation includes switch means actuated in conjunction with and at the end of the range of operation of the rheostat.

References Cited by the Examiner

UNITED STATES PATENTS

| 2,825,854 | 3/1958 | Littwin | 317—157.5 |
| 2,871,417 | 1/1959 | Connoy | 317—157.5 |
| 2,946,932 | 7/1960 | Littwin | 317—157.5 |

SAMUEL BERNSTEIN, *Primary Examiner.*